United States Patent [19]

Jacobson

[11] E Re. 30,978

[45] Reissued Jun. 22, 1982

[54] SELF-RIGHTING POWER-DRIVEN AQUATIC VEHICLE

[76] Inventor: Clayton J. Jacobson, 3500½ Highland, Manhattan Beach, Calif. 90266

[21] Appl. No.: 646,860

[22] Filed: Jan. 5, 1976

Related U.S. Patent Documents

Reissue of:

[64] Patent No.: 3,826,220
Issued: Jul. 30, 1974
Appl. No.: 325,620
Filed: Jan. 22, 1973

[51] Int. Cl.[3] ..... B63B 1/00

[52] U.S. Cl. ..... 114/270; 114/290; 440/42

[58] Field of Search ..... 114/183 R, 185, 271, 114/270, 290; 9/310 R, 310 E; 440/42

[56] References Cited

U.S. PATENT DOCUMENTS

| | | | |
|---|---|---|---|
| 2,965,061 | 12/1960 | Bank et al. | 114/66.5 R |
| 3,052,093 | 9/1962 | Kenefick | 115/12 R X |
| 3,270,707 | 9/1966 | Rozanski | 115/70 |
| 3,324,819 | 6/1967 | Tetyak | 115/6.1 |
| 3,369,518 | 2/1968 | Jacobson | 115/70 |
| 3,456,613 | 7/1969 | Smith | 115/70 |
| 3,481,303 | 12/1969 | Tate et al. | 115/70 |
| 3,623,447 | 11/1971 | Jacobson | 115/70 |
| 3,789,792 | 2/1974 | Smith | 115/70 |

FOREIGN PATENT DOCUMENTS

| | | | |
|---|---|---|---|
| 4693 | 10/1931 | Australia | 115/70 |

*Primary Examiner*—Sherman D. Basinger
*Attorney, Agent, or Firm*—Fulwider, Patton, Rieber, Lee & Utecht

[57] ABSTRACT

A low draft, hydroplane-like vehicle in which the engine and associated equipment is so located in the hull that the engine not only drives a jet pump to power the vehicle but the weight *and location* of the engine and associated equipment [imparts an], *relative to the center of buoyancy of the vehicle, renders the vehicle stable only when it is in an upright position, and the vehicle will immediately right itself from any overturned position. In addition, the weight and location of the engine and associated equipment imparts an* imbalance to the vehicle except when a user is mounted thereon. Due to this imbalance [the vehicle is stable only when in an upright position, and will immediately right itself from any overturned position. A further result of this imbalance is that] the bow is submerged to a substantially greater depth than the stern when a user is not mounted on the vehicle, and as a result the vehicle will slowly circle should the user be inadvertently displaced therefrom. Such slow circling permits the user by swimming a short distance to recapture the vehicle.

7 Claims, 7 Drawing Figures

FIG. 4
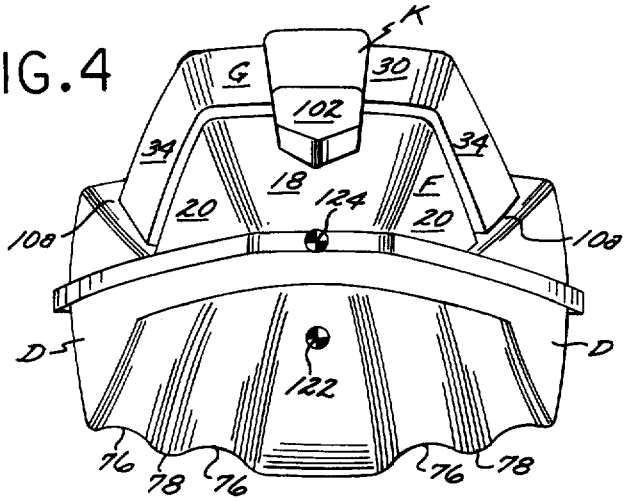
FIG. 5
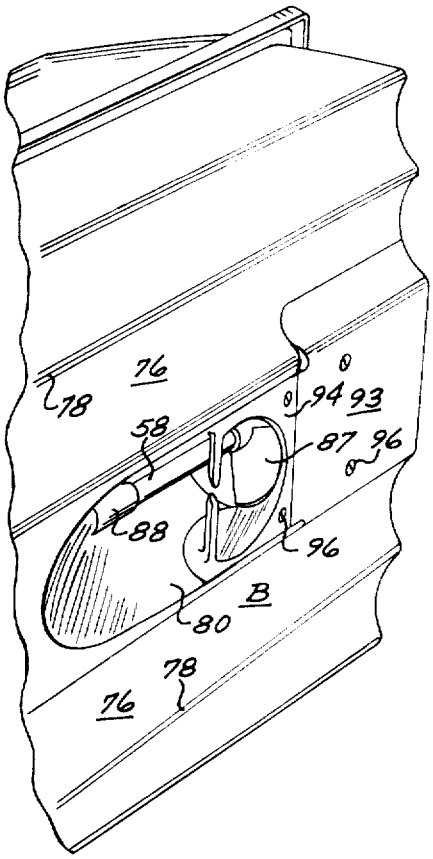
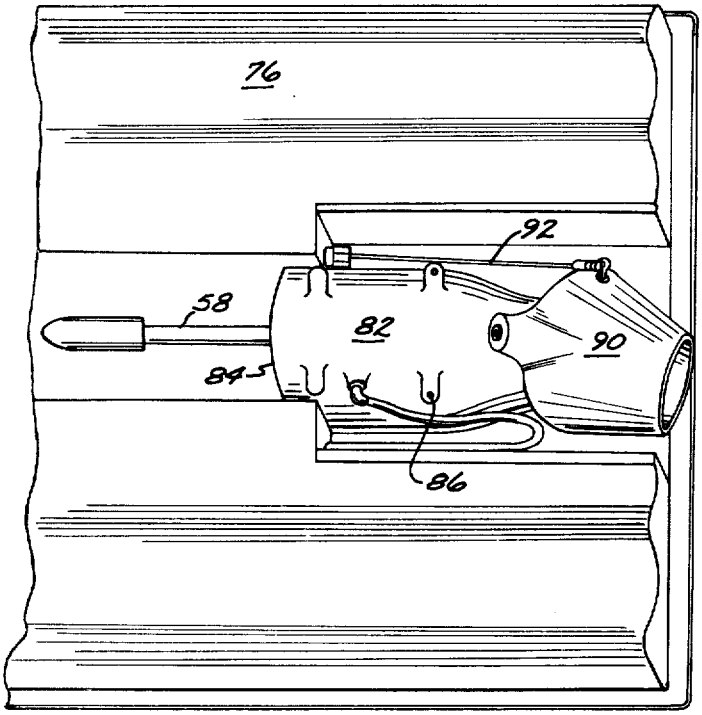
FIG. 6
FIG. 7
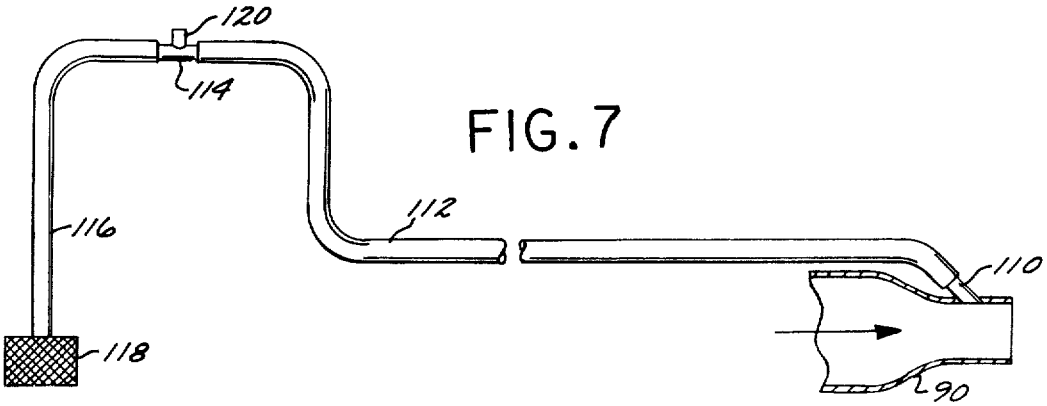

SELF-RIGHTING POWER-DRIVEN AQUATIC VEHICLE

Matter enclosed in heavy brackets [ ] appears in the original patent but forms no part of this reissue specification; matter printed in italics indicates the additions made by reissue.

BACKGROUND OF THE INVENTION

1. Field of the Invention

Self-righting, power-driven aquatic vehicle.

2. Description of the Prior Art

In the past, various types of water jet, power-driven aquatic vehicles have been devised and used, but such vehicles have had the operational disadvantages in that should the user be displaced therefrom inadvertently the vehicle will fall on its side and so float in the water. Upon occasion, water enters through passages defined in the vehicle into the interior thereof, with the water contacting the engine to render the latter inoperative. Also, such prior art power-driven vehicles have the further operational disadvantage that should a user be inadvertently displaced therefrom, the vehicle will continue to operate, and travel in a path where the vehicle cannot be recaptured by the user who is now swimming in the water.

*SUMMARY OF THE INVENTION*

The primary purpose in devising the present power-driven aquatic vehicle is to provide one that is in an imbalanced condition except when the user is supported thereon [, with the vehicle having the operational advantage that it is self-righting from any overturned position should the user be inadvertently displaced therefrom. Also, due]. *Due* to this imbalance the vehicle will continue to slowly circle in the water after a user has fallen therefrom, and at a sufficiently low speed that the user may easily swim to and recapture the vehicle.

[SUMMARY OF THE INVENTION]

[A] *The invention provides a* low draft, water-jet-driven vehicle that is of such structure as to be self-righting should it be inadvertently overturned in the water, and is *also* imbalanced except when a user is supported thereon. Due to this imbalance, should a user inadvertently be displaced from the vehicle, the vehicle will immediately and automatically start to circle at a low speed in the water, and allow the user to swim to the vehicle and recapture the same.

[The vehicle includes an elongate hull having a pivotally supported steering mechanism extending rearwardly from a forward portion thereof, with both the mechanism and the hull being buoyant.] The engine and associated equipment is so located in the hull that the bow of the hull is submerged in the water a substantially greater distance than the stern, except when a user is supported on the vehicle. Due to this differential in submersion, the bow offers greater resistance to passage through the water than the rearward portion of the hull when a user is not positioned on the vehicle, and as a consequence the vehicle will circle in the water after a user is displaced therefrom.

*The vehicle includes an elongated hull having a pivotally supported steering mechanism extending rearwardly from a forward portion thereof, with both the steering mechanism and the hull being buoyant.*

The weight of the engine and associated equipment is so chosen relative to the buoyancy of the hull and steering mechanism that the center of gravity of the vehicle is located below the center of buoyancy thereof. A longitudinal axis extended through the center of gravity will at all times be situated below a second longitudinally extending axis that passes through the center of buoyancy, and as a result the vehicle will be self-righting when inadvertently overturned to any position in the water. The only position in which the vehicle is stable in the water is when the hull is in its normal operating position, with the steering mechanism disposed in either a downwardly extending position or in an upwardly extending position.

BRIEF DESCRIPTION OF THE DRAWING

FIG. 4 is a front elevational view of the vehicle;

FIG. 5 is a perspective view of the bottom portion of the vehicle when the vehicle is turned on its side to illustrate the configuration of the bottom, as well as the positioning of the jet pump thereon;

FIG. 6 is an elevational view of the bottom portion of the vehicle, with the plates that normally extend over the jet pump and steering assembly removed therefrom; and FIG. 7 is a side elevational view of a bilge pump assembly that is actuated by a negative pressure created by water discharging from the jet pump assembly.

DESCRIPTION OF THE PREFERRED EMBODIMENT

Figure 1:
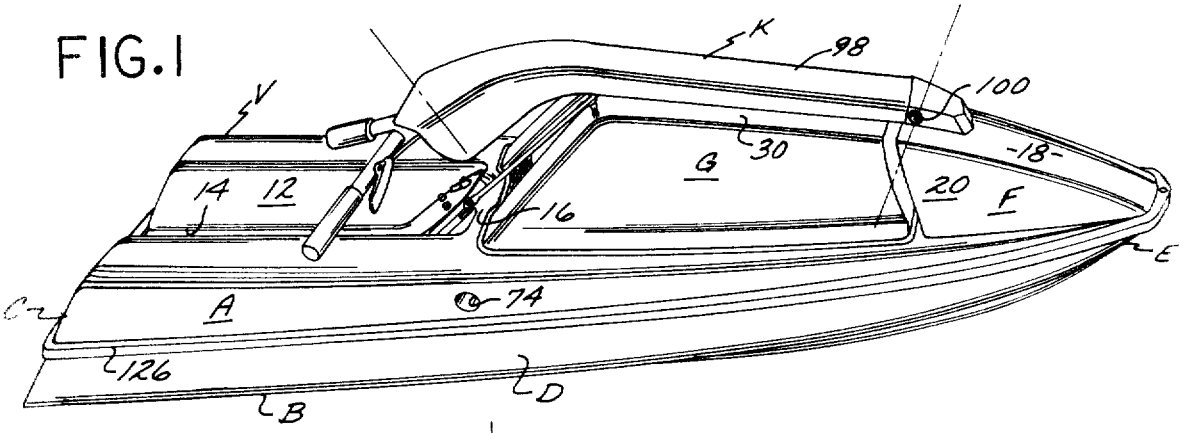
FIG. 1 is a perspective view of the power-driven vehicle, with the steering mechanism pivoted to a downwardly disposed position where it may be operated by a person either kneeling on the hull or lying in a prone position relative thereto.
Figure 2:
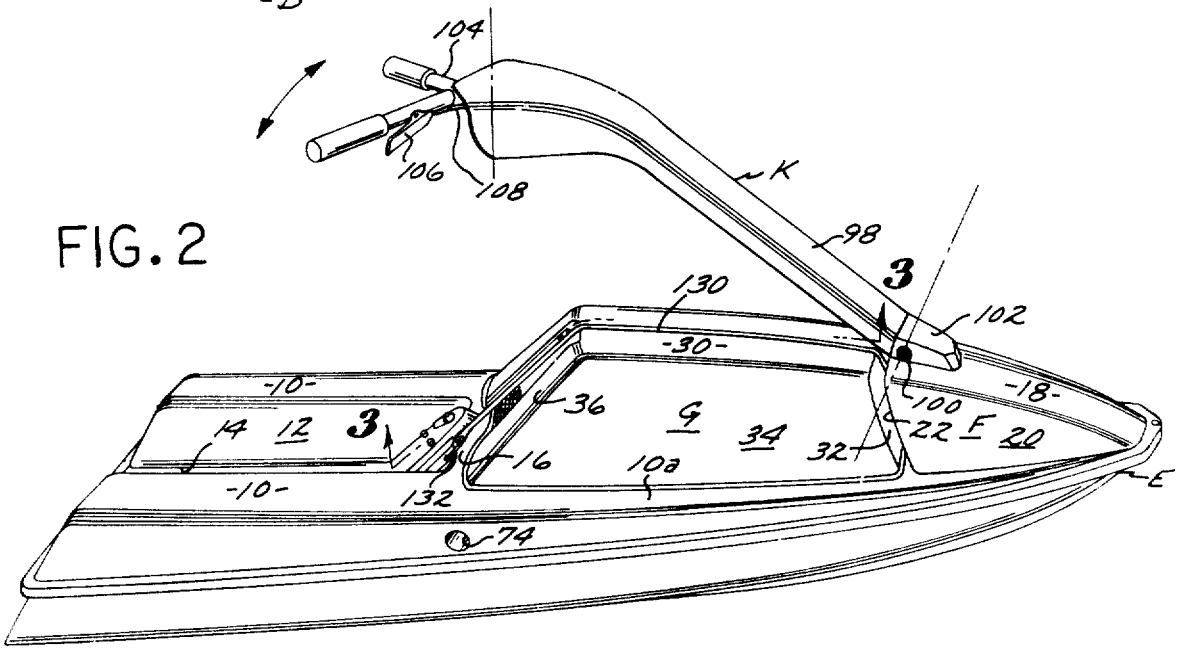
FIG. 2 is the same perspective view of the vehicle as shown in FIG. 1, but with the steering mechanism pivoted to an upwardly and rearwardly extending position.

The vehicle V, as may best be seen in FIGS. 1 and 2, includes a hull A that has an elongate bottom B from which a stern C extends upwardly and preferably forwardly a slight angle. Two laterally spaced side walls D also extend upwardly from the bottom B and intersect at their forward ends to define a bow E. Each of the side walls D on the upper edges thereof develops into an elongate horizontal member 10, which members 10 on their forward ends develop into extensions 10a of narrower width that continue to the bow E. The members 10 on their adjacent edges develop into downwardly extending walls 12, which walls on their lower edges merge into a horizontal platform 14 on which the user (not shown) is supported when operating the vehicle. *The walls 12 and platform 14 define an operator space for the rider of the vehicle.*

Figure 3:
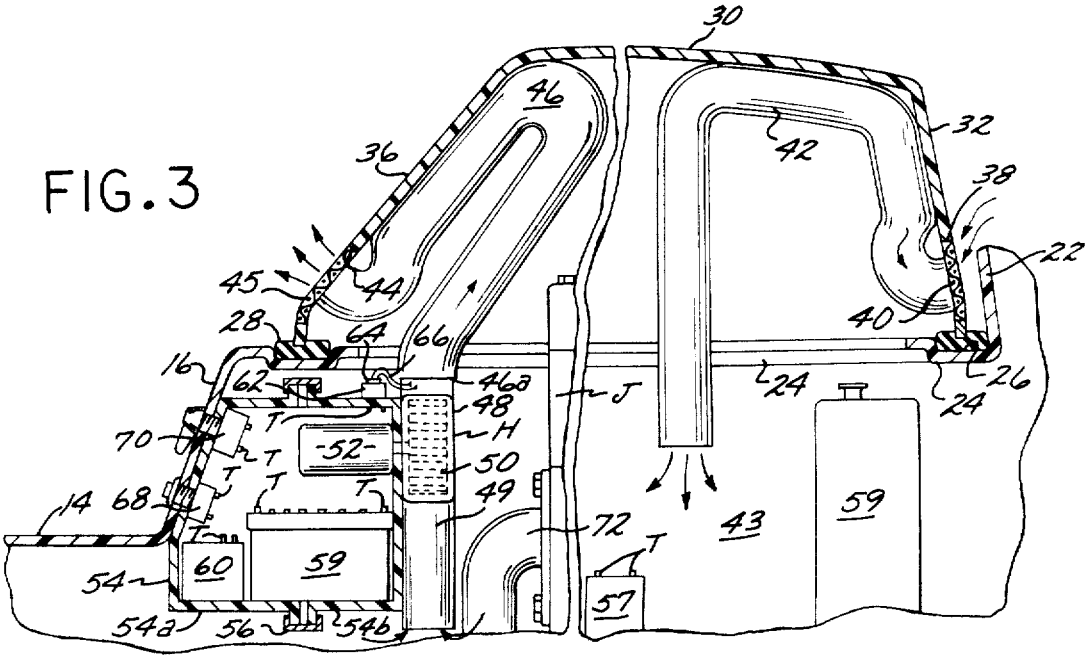
FIG. 3 is a fragmentary, longitudinal cross-sectional view of the vehicle taken on the line 3—3 of FIG. 2.

The walls 12 on their forward ends develop into a transverse forward wall 16, as best seen in FIG. 3, which forward wall merges on its lower end into the platform 14. The hull A adjacent to but rearwardly situated from the bow E develops into an upwardly and rearwardly extending nose F that is defined by an upper, longitudinally extending portion 18 from which two side wall portions 20 extend downwardly to merge into the members 10a. The rearward portion of the nose F is defined by a downwardly and preferably slightly forwardly extending rearward wall 22, as best seen in FIG. 3. The member 10a, the upper portion of the walls 16 and lower rearward portion of the wall 22 all cooperate to define an open rectangular frame 24 that has a recess 26 defined therein in which a continuous strip 28 of a resilient material such as rubber or the like is positioned, for reasons that will later be explained.

A hood G, as may best be seen in FIGS. 1 through 3, includes an elongate, longitudinally extending upper portion 30 that has a forward wall 32 extending downwardly and forwardly therefrom, with the forward wall 32 on opposite edges thereof merging into two laterally spaced, longitudinally extending side walls 34, which side walls on their rearward end merge into an upwardly and forwardly extending rear wall 36. The forward wall 32 of hood G has an opening 38 therein that is preferably closed by screens or otherwise porous material 40, with the opening 38 being in communication with an inverted U-shaped tubular member 42, as shown in FIG. 3, and through which tubular member air may flow from the ambient atmosphere into the interior 43 of the hull A.

The rearward wall 36 of hood G has an opening 44 therein that likewise has a screen or porous material 45 extending thereacross, and this opening being in communication with an inverted tubular U-shaped member 46 that preferably slopes upwardly and forwardly at an angle. An end 46a of tubular member 46 is removably connected by conventional means to an air discharge in a housing 48 of a blower H. Blower H includes an impeller 50 that is driven by an electric motor 52. The air inlet of housing 48 is connected to a tube 49 that is in communication with confined space 43. The wall 16, which also serves as the dashboard, supports on the forward surface thereof a first portion 54a of a watertight box 54, which first portion 54a sealingly engages a second forwardly extending box portion 54b, as best seen in FIG. 3. The box portions 54a and 54b at their junction are removably sealed in watertight contact with one another by conventional sealing means 56.

Power for driving the vehicle V is provided by an internal combustion engine J, as may be seen in FIG. 3, that has a drive shaft 58 extending rearwardly therefrom that is illustrated in FIGS. 5 and 6. A storage battery 59 that serves to power the motor 52 is situated within the confines of the box 54, as is all the electrical accessories that are necessary in the operation of an internal combustion engine J and which are indicated jointly in the box 54 by the numeral 60 as shown in FIG. 3. The engine J has an electrically operated starter 57 operatively associated therewith as well as a fuel tank 59 that is preferably situated in confined space 43. A waterproof electric plug 62 is mounted on the box 54 and has a number of terminals T that are connected by electrical conduits (not shown) situated within the box 54 to terminals T on the motor 52, accessories 60 and battery 59. The plug 62 has a second plug 64 removably secured thereto and in watertight connection therewith, which second plug 64 is connected to electrical conductors 66 that are waterproof, and extend to the ignition system of the engine J (not shown) and to terminals T on starter 57. The wall 16 that acts as a dashboard serves to support an engine starting switch 68 and fan control switch 70, each of which have terminals T situated within the confines of the box 54 and connected by wiring (not shown) to other appropriate terminals T in the electrical assembly illustrated in FIG. 3.

An exhaust pipe 72 extends from engine J to a water-cooled muffler (not shown) of the same structure as shown in my U.S. Pat. No. 3,623,447 that issued Nov. 30, 1971, entitled "Powered Aquatic Vehicle." The water-cooled muffler (not shown) has a tube (not shown) extending therefrom to an exhaust opening 74 shown in one of the sides D of the vehicle, as best seen in FIGS. 1 and 2, in the same manner as described in said U.S. Pat. No. 3,623,447.

The bottom B of the vehicle V is formed to define a number of longitudinally extending concavities 76, which at the juncture thereof define longitudinally extending edges 78 that are transversely separated from one another, with this configuration of the bottom resulting in the vehicle having an improved lift, allows the use of a boat bottom of relatively small area, and with said edges and narrowness of the hull allowing the vehicle to cut sharply in the water without appreciable side-wise slippage.

In the rear central portion thereof, the bottom B defines a longitudinally extending cavity 80 in which a housing 82 of a jet pump assembly 84 is positioned and held therein by screws or bolts. The pump assembly 84 includes an impeller 87 that is driven by the shaft 58, which shaft extends through a journal 88 situated in the forward portion of the recess 80 illustrated in FIG. 5. The pump assembly includes a pivotally supported nozzle 90 that is controlled by movement of a rod or cable 92 secured thereto. Pivotal movement of the nozzle 90 varies the direction at which the jet of water (not shown) is discharged from the vehicle, and this direction of discharge controls the path the vehicle will follow under the guidance of the user. Plates 93 and 94 span the rear portion of the recess 80 and are removably secured to the bottom B by screws 96, or the like. The plates 93 and 94 prevent the nozzle 90 and pump assembly 84 from being contacted by hard objects such as gravel, or the like, if the vehicle is directed upon an embankment or sandy shore.

A steering mechanism K is shown in FIGS. 1 and 2 that includes an elongate, hollow, buoyant housing 98, which by a pin 100 is pivotally secured to a mounting 102 situated on the nose F of the vehicle[.], *pivoting about the horizontal axis indicated in phantom lines at the right side of FIGS. 1 and 2.* At the upper rear extremity thereof, the housing 98 pivotally supports a handlebar-like guiding member 104. Pivotal movement of the guiding member 104 results in movement of the cable or rod 92 to pivot the nozzle 90 relative to the vehicle V for guiding purposes. The guiding member 104 pivotally supports a control 106 for the engine J, with the control having a flexible cable 108 extending thereto to the appropriate portion of the engine. The steering mechanism K, as may best be seen in FIG. 1, may be pivoted to a downwardly longitudinally extending position, or if desired, the steering mechanism may be raised to the upwardly and rearwardly extending position shown in FIG. 2. The position of the steering mechanism K illustrated in FIG. 2 will be used when the operator (now shown) is standing in an upright position on the deck 14[.], *with the handlebar-like guiding member pivoting about the vertical axis indicated in phantom lines at the left side of FIG. 2.* Although the steering mechanism K is buoyant, it possesses sufficient weight to automatically pivot to the position shown in FIG. 1 when not supported by a user (not shown).

The nozzle 90, as may be seen in FIG. 7, has a tube 110 connected to the interior thereof, and the interior of the tube has a negative pressure therein when water is discharging as a jet from the nozzle. The tube 110 is connected to a conduit 112 that extends forwardly to a tee 114, from which tee a second conduit 116 extends to a strainer 118 that is located in the lower portion of space 43. The tee 114 includes an anti-siphon device 120. When the vehicle V is operating, the interior of the strainer 118 at all times has a negative pressure maintained therein, and any water accumulating within the interior of the vehicle is drawn into the strainer 118 and discharged through the conduits 116 and 112, and tube 110 into water discharging through the nozzle 90.

Positioning of the engine J and the components held within the confines of the box 54 is critical relative to the hull A. The weight distribution of the engine and components in the box 54 must be such that when the vehicle V does not have a user thereon, the bow E of the vehicle will be submerged to a substantially greater depth than the stern C thereof. Due to the differential in submersion of the bow and stern, the bow offers considerably more resistance to the water as the vehicle V is moved therethrough by discharge of water through the nozzle 90, whereby the vehicle will tend to travel through a circular path should the operator be inadvertently displaced therefrom. However, when an operator is standing on the platform 14, the balance of the vehicle V is changed and then the bow portion thereof extends upwardly out of the water a greater distance than the stern C to permit hydroplaning of the vehicle when it is driven through the water by a jet from the nozzle 90.

In FIG. 4 it will be seen that the center of gravity 122 of the vehicle V is a substantial distance below the center of buoyancy 124 of the vehicle. Due to this differential in vertical position shown in FIG. 4, and in the event the vehicle inadvertently overturns in the water, it will immediately move from any overturned position to assume the upright position. The longitudinally extending recess configuration of the bottom B as shown in FIG. 5, is also of importance in operation of the vehicle V, for due to the edges 78 the vehicle will tend to have a minimum of slippage when pursuing a tight circular or curved path. Streams of water flow through the longitudinally extending recesses 76 when the vehicle is operating, and as a result, the vehicle tends to follow a straight path.

The hull A is preferably formed from fiber glass impregnated with a suitable polymerizable resin, and may be made either as an integral unit exclusive of the hood G, or if desired may be made in two or more longitudinally extending parts that are bonded together along flanged portions 126, as shown in FIG. 1. A strap 130 is secured to the rear portion of the nose F and extends over the hood G to an over-center clamp 132 removably secured to wall 16. The strap 130 serves to removably hold the hood G in sealing engagement with the resilient strip 28 shown in FIG. 3.

From the previous description of the structure and operation of the vehicle it will be seen that the engine J and associated equipment 60 not only serve to power the vehicle, but they are so located in the vehicle that there is a differential in spacing between the center of buoyancy and center of gravity whereby the vehicle is self-righting from any overturned position. Also, the weight of the engine J and associated equipment 60 is so located longitudinally on the vehicle that the bow E is submerged a greater depth than the stern C when no operator is present on the vehicle. Due to this differential in the depth of submersion, the bow E offers greater resistance to movement through the water than that portion of the hull rearwardly therefrom, and as a result the vehicle V will automatically circle if a user is displaced therefrom. Such circling movement of the vehicle V permits easy recapture of the vehicle by the user swimming in the water.

The steering and control mechanism K is buoyant, but is of sufficient weight as to at all times tend to pivot to the lowermost position shown in FIG. 1 when the vehicle is in an upright position. Also, the steering and control mechanism is of sufficient length as to be operable by a user, either when the user is supported on the deck 14, or when he is in the water immediately rearward the stern C. Due to the user being able to guide the vehicle as well as control the speed thereof when in the water immediately rearward the stern of the vehicle, the ease with which he may regain an operating position on the vehicle is greatly improved.

The use and operation of the invention has previously been described in detail and need not be repeated.

I claim:

1. A power-driven aquatic vehicle of the type in which a user stands in an upright position thereon and which includes a hollow, elongate, buoyant hull defined by a bottom, side walls, stern, bow, deck, and removable hood that cooperatively define a confined space within the interior thereof; a jet pump and pivotally supported nozzle assembly mounted on said hull adjacent said stern; a drive shaft connected to said pump and extending forwardly into said confined space; means for guiding said vehicle by pivoting said nozzle as said pump discharges a jet of water rearwardly therethrough, said vehicle being characterized by a. an engine and associated equipment for operating said engine, which engine is connected to said drive shaft, with said engine and associated equipment being of substantial weight and so located in said confined space as to not only drive said drive shaft, but to cooperate with said hull to maintain said bow in a lower position in the water than said stern except when a user is standing on said deck, which [hull] bow, due to said lower position offers greater resistance to the passage through water than said stern to cause said vehicle to circle in said water should a user of said vehicle be inadvertently displaced therefrom, and with the positioning of said engine and associated equipment being so related to said hull that the center of buoyancy of said hull is above the center of gravity of said hull to cause said vehicle to immediately pivot to an upright position in the water after it has been inadvertently overturned and is free from said user.

*2. A power-driven aquatic vehicle comprising:*

*a hollow, elongated buoyant hull having a stern and a bow and defining an operator space adjacent said stern to accommodate the vehicle operator;*

*a jet pump mounted on said hull adjacent said stern;*

*an engine carried by said hull for operating said jet pump, said engine being located forwardly of said operator space, the weight of said engine and other components of the vehicle located forwardly of said operator space being sufficient, in the absence of a vehicle operator in said operator space, to dispose said bow deep enough in the water to offer greater resistance to passage through the water than said stern thereby to swing said bow to one side and cause said vehicle to circle, the weight of said engine and other*

*components of the vehicle located forwardly of said operator space being sufficient to balance the weight of a vehicle operator and components located rearwardly of said operator space so that said vehicle tends to follow a straight path when said operator space is occupied by a vehicle operator;*

*an elongated steering arm having a lower end pivotally connected to said hull and an upper end movable between an upwardly inclined upper position and a substantially horizontal lower position; and*

*steering means carried at said upper end, said steering means being operable in said lower position of said steering arm by an operator located in the water adjacent said stern, said steering means further being operable in said upper position of said steering arm by an operator standing on the portion of said hull defining said operator space.*

*3. An aquatic vehicle according to claim 2 wherein the bottom of said hull includes a plurality of longitudinally extending concavities defining transversely spaced apart longitudinal edges operative to provide improved lift.*

*4. An aquatic vehicle according to claim 2 wherein said hull is formed of two longitudinally extending glass fiber sections bonded together along a pair of flanged portions extending about the periphery of said hull.*

*5. A power-driven aquatic vehicle comprising:*

*a hollow, elongated buoyant hull having a stern and a bow and defining an operator space adjacent said stern to accommodate the vehicle operator;*

*an elongated steering arm having a lower end pivotally connected to said hull and an upper end freely movable about a horizontal axis, between an upwardly inclined upper position and a substantially horizontal lower position, said steering arm being buoyant and thereby tending to rise when submerged, said steering arm further including steering means carried at said upper end of said steering arm and operable in said lower position of said steering arm by an operator located in the water adjacent said stern, said steering means further being pivotable about a vertical axis in said upper position of said steering arm by an operator standing on the portion of said hull defining said operator space; and*

*an engine carried by said hull, the center of gravity of said engine and other components of said vehicle, relative to the center of buoyancy of said hull, being operative with said steering arm to urge said hull to an upright position if overturned.*

*6. A power-driven aquatic vehicle comprising:*

*a hollow, elongated buoyant hull having a stern and a bow and defining an operator space adjacent said stern to accommodate the vehicle operator;*

*an elongated buoyant steering arm having a lower end pivotally connected to said hull and an upper end freely movable between an upwardly inclined upper position and a substantially horizontal lower position; and*

*an engine carried by said hull, the center of gravity of said engine and other components of said vehicle, relative to the center of buoyancy of said hull, being operative to urge said hull to an upright position if overturned, said engine being located forwardly of said operator space, the weight of said engine and other components of the vehicle located forwardly of said operator space being sufficient, in the absence of a vehicle operator in said operator space, to dispose said bow deep enough in the water to offer greater resistance to passage through the water than said stern thereby to swing said bow to one side and cause said vehicle to circle, the weight of said engine and other components of the vehicle located forwardly of said operator space being sufficient to balance the weight of a vehicle operator and components located rearwardly of said operator space so that said vehicle tends to follow a straight path when said operator space is occupied by a vehicle operator.*

*7. An aquatic vehicle according to claim 5 wherein said hull is formed of two longitudinally extending glass fiber sections bonded together along a pair of flanged portions lying in the same plane and extending about the periphery of said hull.*

* * * * *